(12) United States Patent
Tomari et al.

(10) Patent No.: US 10,444,654 B2
(45) Date of Patent: *Oct. 15, 2019

(54) CONDUCTIVE MEMBER, CHANGING DEVICE, TRANSFER DEVICE, PROCESS CARTRIDGE, AND IMAGE FORMING APPARATUS

(71) Applicant: FUJI XEROX CO., LTD., Tokyo (JP)

(72) Inventors: Shogo Tomari, Kanagawa (JP); Yuki Tagawa, Kanagawa (JP); Masato Ono, Kanagawa (JP); Minoru Rokutan, Kanagawa (JP); Yuma Tanaka, Kanagawa (JP); Masayuki Seko, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 15/795,264

(22) Filed: Oct. 27, 2017

(65) Prior Publication Data

US 2019/0004445 A1    Jan. 3, 2019

(30) Foreign Application Priority Data

Jun. 29, 2017 (JP) .................................. 2017-127099

(51) Int. Cl.

| G03G 15/02 | (2006.01) |
|---|---|
| H02J 7/00 | (2006.01) |
| C08K 5/39 | (2006.01) |
| G03G 15/08 | (2006.01) |
| G03G 15/16 | (2006.01) |
| G03G 21/18 | (2006.01) |
| B29K 9/06 | (2006.01) |
| B29K 23/00 | (2006.01) |

(52) U.S. Cl.
CPC .......... G03G 15/0233 (2013.01); C08K 5/39 (2013.01); G03G 15/0808 (2013.01); H02J 7/0042 (2013.01); *B29K 2009/06* (2013.01); *B29K 2023/16* (2013.01); *B29K 2995/0005* (2013.01); *G03G 15/0818* (2013.01); *G03G 15/16* (2013.01); *G03G 15/1685* (2013.01); *G03G 21/18* (2013.01)

(58) Field of Classification Search
CPC .......... G03G 15/0233; G03G 15/1685; G03G 2215/1614
See application file for complete search history.

(56) References Cited

U.S. PATENT DOCUMENTS

| 9,715,192 B2 | 7/2017 | Tanemura et al. | |
| 10,095,149 B1 * | 10/2018 | Tomari | C08K 5/42 |
| 10,168,635 B1 * | 1/2019 | Tomari | G03G 15/162 |

(Continued)

FOREIGN PATENT DOCUMENTS

| JP | 2003-105119 | 4/2003 |
| JP | 2014-085536 | 5/2014 |

*Primary Examiner* — Thomas S Giampaolo, II
(74) *Attorney, Agent, or Firm* — JCIPRNET (57) ABSTRACT

A conductive member includes a conductive substrate; and a conductive elastic layer disposed on the conductive substrate and exhibiting ionic conduction. The conductive elastic layer contains an elastic material, which contains epichlorohydrin rubber, and an anti-aging agent, and the amount of free chlorine ions in the conductive elastic layer is 1 µg/g or more and 80 µg/g or less.

15 Claims, 2 Drawing Sheets

(56) References Cited

U.S. PATENT DOCUMENTS

2013/0164051 A1* 6/2013 Ageishi ............... B32B 25/04
 399/313
2014/0113782 A1* 4/2014 Tanemura .......... G03G 15/1685
 492/18

* cited by examiner

CONDUCTIVE MEMBER, CHANGING DEVICE, TRANSFER DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2017-127099 filed Jun. 29, 2017.

BACKGROUND (i) Technical Field

The present invention relates to a conductive member, a charging device, a transfer device, a process cartridge, and an image forming apparatus.

(ii) Related Art

An image is formed by an electrophotographic method including forming an electrostatic latent image on the surface of a photoreceptor by charging and exposure, forming a toner image by developing the electrostatic latent image with a charged toner, and transferring and fixing the toner image to a recording medium such as paper or the like. An image forming apparatus which forms an image by this method is provided with a member which performs each of charging, exposure, transfer, etc.

SUMMARY

According to an aspect of the invention, there is provided a conductive member including a conductive substrate and a conductive elastic layer disposed on the conductive substrate and exhibiting ionic conduction. The conductive elastic layer contains an elastic material, which contains epichlorohydrin rubber, and an anti-aging agent, and the amount of free chlorine ions in the conductive elastic layer is 1 µg/g or more and 80 µg/g or less.

BRIEF DESCRIPTION OF THE DRAWINGS

Exemplary embodiments of the present invention will be described in detail based on the following figures, wherein.

DETAILED DESCRIPTION

Exemplary embodiments of the present invention are described below.

In this specification, when plural substances corresponding to components are present, a component amount represents a total amount of the plural substances unless otherwise specified.

In this specification, the term "conductive" represents that a volume resistivity in a normal-temperature normal-humidity environment (environment of 22° C. and 55% RH) is $10^{14}$ Ω·cm or less.

<Conductive Member>

A conductive member according to an exemplary embodiment of the present invention includes a conductive substrate and a conductive elastic layer disposed on the conductive substrate and exhibiting ionic conduction, the conductive elastic layer containing an elastic material, which contains epichlorohydrin rubber, and an anti-aging agent, and the amount of free chlorine ions in the conductive elastic layer being 1 µg/g or more and 80 µg/g or less.

The conductive elastic layer containing epichlorohydrin rubber (may be referred to as "ECO" hereinafter) may contain free chlorine ions which are generated by desorption of chlorine (Cl) coordinated to side chains of ECO due to vulcanization during molding. When a current with the same polarity is repeatedly applied to the conductive member having the conductive elastic layer containing free chlorine ions, the chlorine ions are unevenly distributed to one side in the thickness direction of the conductive elastic layer. The unevenly distributed chlorine ions inhibit electron transfer. Therefore, the conductive member having the conductive elastic layer which exhibits ionic conduction causes an increase in resistance due to the inhibition of electron transfer caused by the unevenly distributed chlorine ions.

Therefore, in the conductive member according to the exemplary embodiment, the amount of free chlorine ions in the conductive elastic layer which contains epichlorohydrin rubber and the anti-aging agent and exhibits ionic conduction is 1 µg/g or more and 80 µg/g or less. Oxidative deterioration of the elastic material is suppressed by the anti-aging agent contained in the conductive elastic layer. Also, the amount of free chlorine ions in the conductive elastic layer is suppressed to 80 µg/g or less, and thus even when chlorine ions are unevenly distributed to one side in the thickness direction of the conductive elastic layer, electron transfer is hardly inhibited.

Therefore, the occurrence of increase in resistance is suppressed when a current with the same polarity is repeatedly applied to the conductive member according to the exemplary embodiment.

On the other hand, in the conductive member according to the exemplary embodiment, the amount of free chlorine ions in the conductive elastic layer which contains epichlorohydrin rubber and the anti-aging agent and exhibits ionic conduction is 1 µg/g or more. Thus, an excessive decrease in resistance in a high-temperature high-humidity environment (for example, an environment of 35° C. and 85% RH) is suppressed. When the amount of free chlorine ions in the conductive elastic layer is excessively small, moisture may exhibit a conductive function in a high-temperature high-humidity environment (for example, an environment of 35° C. and 85% RH), thereby excessively decreasing the resistance of the conductive elastic layer. When the conductive member is applied to a charging member or a transfer member, a decrease in resistance of the conductive elastic layer causes a voltage drop due to local concentration of charge (leakage) in a pinhole forming portion of a photoreceptor, a foreign matter adhering portion of a photoreceptor, a thin-film portion of a photoreceptor, or the like. This may cause color spots due to a charging failure or density unevenness due to a transfer failure because a sufficient electric field for toner transfer cannot be obtained. Therefore, the amount of chlorine ions in the conductive elastic layer is 1 µg/g or more.

When the conductive member has the conductive elastic layer which contains an electronically conductive agent (carbon black or the like) and exhibits electronic conduction, electron transfer is inhibited by unevenly distributed chlorine ions, but the conductive member produces little increase in resistance even when containing epichlorohydrin rubber because it has a conductive path formed by the electronically conductive agent.

The "conductive elastic layer exhibiting ionic conduction" represents a conductive elastic layer which has a difference of 0.8 log Ω·cm or more between the volume resistivity of the conductive elastic layer after storage of the conductive member for 10 hours in a high-temperature high-humidity environment (environment of 28° C. and 85% RH) and the volume resistivity of the conductive elastic layer after storage of the conductive member for 10 hours in a low-temperature low-humidity environment (10° C. and 15% RH).

When the difference in volume resistivity is less than 0.8 log Ω·cm, the conductive elastic layer corresponds to a conductive elastic layer exhibiting electronic conduction.

A method for measuring the volume resistivity of the conductive elastic layer is as follows.

A measurement sample having the same thickness as the conductive elastic layer is obtained from the conductive elastic layer of the conductive member. The volume resistivity of the measurement sample is measured by using a measurement jig (MPC Probe UR-SS: manufactured by Mitsubishi Chemical Analytech Co., Ltd.) and a high resistance meter (R8340A digital high resistance/micro-current meter: manufactured by Advantest Corporation) according to JIS K 6911 (1995). Specifically, a voltage adjusted so that an electric field (applied voltage/measurement sample) is 1000 V/cm is applied to the measurement sample for 30 seconds, and then the volume resistivity is calculated from the flowing current value by using a formula below. The measurement environment is a normal-temperature normal-humidity environment (environment of 22° C. and 55% RH).

Volume resistivity (Ω·cm)=(0.07×applied voltage (V))/(current value (A)×thickness of measurement sample (cm))

The thickness of the conductive elastic layer (measurement sample) is measured by using an eddy current-type film thickness meter CTR-1500E manufactured by Sanko Electronic Co., Ltd.

The conductive member according to the exemplary embodiment is described below with reference to the drawings.

Figure 1:
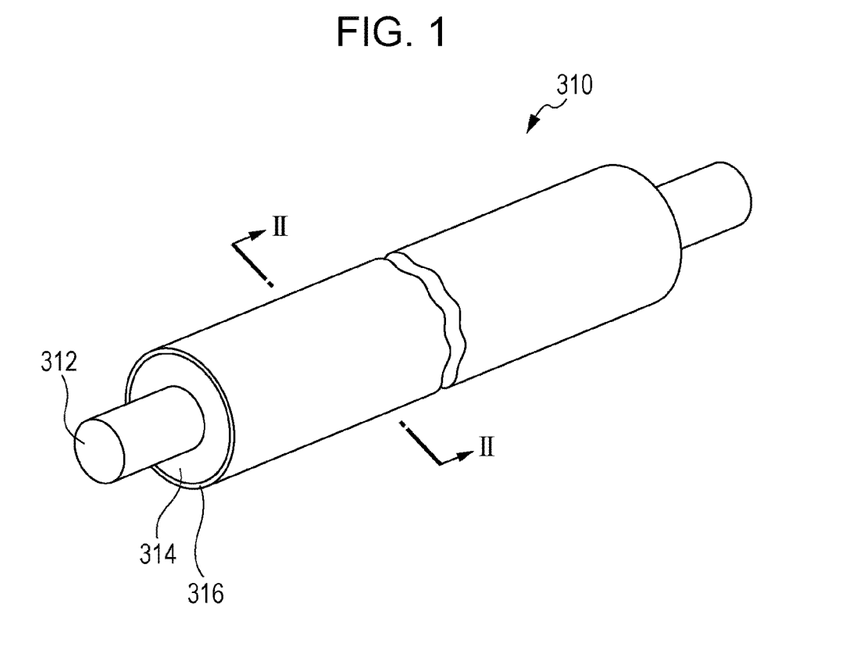
FIG. 1 is a schematic perspective view showing an example of a conductive member according to an exemplary embodiment of the present invention.
Figure 2:
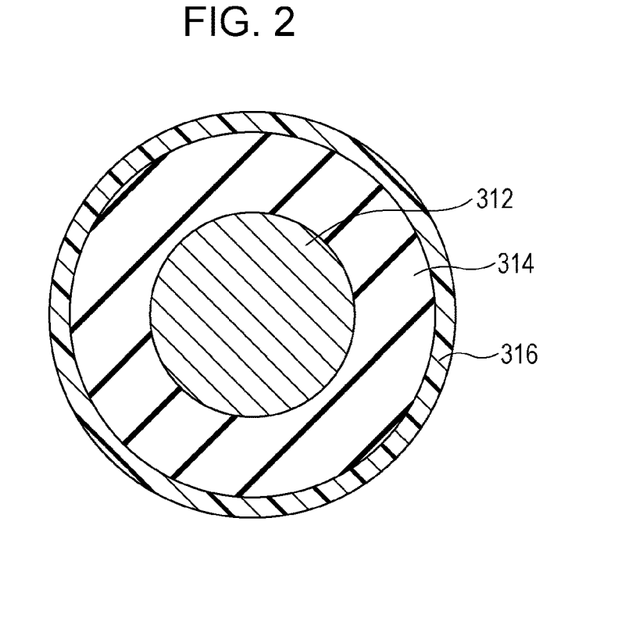
FIG. 2 is a schematic sectional view taken along II-II in FIG. 1 and showing an example of a conductive member according to an exemplary embodiment of the present invention.

FIG. 1 is a schematic perspective view showing an example of the conductive member according to the exemplary embodiment. FIG. 2 is a schematic sectional view showing an example of the conductive member according to the exemplary embodiment. FIG. 2 is a sectional view taken along II-II in FIG. 1.

As shown in FIGS. 1 and 2, a conductive member 310 according to the exemplary embodiment is, for example, a roller member having a cylindrical or columnar conductive substrate 312 (shaft), a conductive elastic layer 314 disposed on the outer periphery of the conductive substrate 312, and a surface treated layer 316 formed by treating the surface layer of the conductive elastic layer 314. The conductive member according to the exemplary embodiment may be a belt member.

The configuration of the conductive member 310 according to the exemplary embodiment is not limited to the above and may be, for example, a configuration not having the surface treated layer 316, that is, a configuration including the conductive substrate 312 and the conductive elastic layer 314.

Also, the conductive member 310 may have a configuration including an intermediate layer (for example, an adhesive layer) disposed between the conductive elastic layer 314 and the conductive substrate 312 and a resistance adjusting layer or anti-transfer layer disposed between the conductive elastic layer 314 and the surface treated layer 316.

The conductive member 310 according to the exemplary embodiment is described in detail below. In the description below, reference numerals are omitted.

(Conductive Substrate)

The conductive substrate is described.

The conductive substrate used is made of, for example, a conductive material such as a metal or alloy such as aluminum, a copper alloy, stainless steel, or the like, iron plated with chromium, nickel, or the like, a conductive resin, or the like.

The conductive substrate functions as an electrode and a support member of a charging roller, and examples of the material thereof include metals such as iron (free-cutting steel or the like), copper, brass, stainless, aluminum, nickel, and the like. Examples of the conductive substrate include a member (a resin member, a ceramic member, or the like) having a plated external peripheral surface, a member (a resin member, a ceramic member, or the like) containing a conductive agent dispersed therein, and the like. The conductive substrate may be a hollow member (cylindrical member) or a non-hollow member.

(Elastic Layer)

The conductive elastic layer is described.

The conductive elastic layer is a conductive elastic layer exhibiting ionic conduction. The conductive elastic layer contains the elastic material and the anti-aging agent. If required, the conductive elastic layer contains an ionic conductive agent, other additives, etc.

The conductive elastic layer may be a foamed elastic layer or a non-foamed elastic layer.

—Amount of Free Chlorine Ions—

The amount of free chlorine ions in the conductive elastic layer is 1 μg/g or more and 80 μg/g or less, preferably 5 μg/g or more and 60 μg/g or less, and more preferably 10 μg/g or more and 40 μg/g or less.

The amount of free chlorine ions in the conductive elastic layer may be adjusted within the range by introducing washing, decreasing the vulcanization temperature, or the like. For example, increases in the washing time and the drying time after washing tend to decrease the amount of free chlorine ions. Also, a decrease in the vulcanization temperature for forming the conductive elastic layer tends to decrease the amount of free chlorine ions.

A method for measuring the amount of free chlorine ions in the conductive elastic layer is as follows.

First, 0.5 g of a sample is collected from the conductive elastic layer of the conductive member. Then, 0.5 g of the sample is placed in a resin-made vessel, and 100 mL of ultra-pure water (0.058 μS/cm) is added to the resin-made vessel, in which ion components are extracted by immersion for 30 minutes. The extract is diluted 50-fold and injected into ion chromatography (ICS-2100 manufactured by Thermo Fisher Scientific Inc.) to measure chlorine ions. A column AS-19 (manufactured by Thermo Fisher Scientific Inc.) is used, and potassium hydroxide is used as an eluent and supplied at a flow rate of 1.0 mL/min. The chlorine ions are quantitatively determined by an absolute calibration curve method using an electric conductivity detector and a mixed standard solution containing chlorine ions (Kanto Chemical, anion mixed standard solution I), and an amount of chlorine ions is determined.

This operation is performed for three types of samples collected from both ends and a central portion in the thickness direction of the conductive elastic layer of the conductive member, and the average value is considered as the amount of free chlorine ions.

—Elastic Material—

The elastic material contains epichlorohydrin rubber. The elastic material may contain an elastic material other than epichlorohydrin rubber.

However, the amount of epichlorohydrin rubber relative to 100 parts by mass of the elastic material is preferably 10 parts by mass or more and 100 parts by mass or less, more preferably 20 parts by mass or more and 100 parts by mass or less, still more preferably 50 parts by mass or more and 100 parts by mass or less, particularly preferably 70 parts by mass or more and 100 parts by mass or less, and most preferably 90 parts by mass or more and 100 parts by mass or less.

Examples of the epichlorohydrin rubber include epichlorohydrin homopolymer rubber, copolymer rubber (epichlorohydrin-ethylene oxide copolymer rubber, epichlorohydrin-allyl glycidyl ether copolymer rubber, epichlorohydrin-ethylene oxide-allyl glycidyl ether terpolymer rubber, and the like), a rubber mixture thereof, and the like.

Examples of the other elastic material include isoprene rubber, chloroprene rubber, butyl rubber, polyurethane, silicone rubber, fluorocarbon rubber, styrene-butadiene rubber, butadiene rubber, nitrile rubber, ethylene-propylene rubber, epichlorohydrin-ethylene oxide copolymer rubber, epichlorohydrin-ethylene oxide-ally glycidyl ether copolymer rubber, ethylene-propylene-diene terpolymer rubber (EPDM), acrylonitrile-butadiene copolymer rubber (NBR), natural rubber, a rubber mixture thereof, and the like.

—Anti-aging Agent—

Examples of the anti-aging agent include a phenol-based anti-aging agent, an amine-based anti-aging agent, an imidazole-based anti-aging agent, an organic sulfur-based anti-aging agent, a phosphite-based anti-aging agent, a dithiocarbamic acid salt-based anti-aging agent, a thiourea-based anti-aging agent, and the like.

The phenol-based anti-aging agent is, for example, a hindered phenol-based compound having a substituent (for example, a branched alkyl group such as a tert-butyl group or the like) at the ortho-position with respect to a phenolic hydroxyl group.

Specific examples of the phenol-based anti-aging agent include a monophenol-based anti-aging agent, a bisphenol-based anti-aging agent, and a polyphenol-based anti-aging agent.

Examples of the monophenol-based anti-aging agent include 2,6-di-tert-butyl-4-methylphenol, 2,6-di-tert-butyl-4-ethylphenol, 2,6-di-tert-butylphenol, 2,4,6-tri-tert-butylphenol, styrenated phenol, and the like.

Examples of the bisphenol-based anti-aging agent include 2,2'-methylenebis(4-methyl-6-tert-butylphenol), 2,2'-methylenebis(4-ethyl-6-tert-butylphenol), 4,4'-thiobis(3-methyl-6-tert-butylphenol), 4,4'-butylidenebis(3-methyl-6-tert-butylphenol), 4,4'-methylenebis(2,6-tert-butylphenol), 4,4'-isopropylidenebis(2,6-di-tert-butylphenol), 2,2'-isobutylidenebis(4,6-dimethylphenol), and the like.

Examples of the polyphenol-based anti-aging agent include 2,5-di-tert-butylhydroquinone, 2,5-di-tert-amylhydroquinone, tert-butylcatechol, and the like.

The amine-based anti-aging agent is, for example, an aromatic amine having an aromatic group (for example, a phenyl group, a naphthyl group, or the like) bonded to a nitrogen atom.

Specific examples of the amine-based anti-aging agent include N-phenyl-1-naphthylamine, N,N'-diphenyl-p-phenylenediamine, N,N'-di-2-naphthyl-p-phenylenediamine, N-phenyl-N'-isopropyl-p-phenylenediamine, di(4-octylphenyl)amine, 4,4'-bis($\alpha,\alpha$-dimethylbenzyl)diphenylamine, p-(p-toluenesulfonylamide)diphenylamine, N-phenyl-N'-(1,3-dimethylbutyl)-p-phenylenediamine, and the like.

Examples of the imidazole-based anti-aging agent include 2-mercaptobenzimidazole, 2-mercaptobenzimidazole zinc salt, 2-mercaptomethylbenzimidazole, and the like.

The conductive elastic layer may contain one anti-aging agent or two or more anti-aging agents.

From the viewpoint of suppressing the phenomenon (bleeding) that when the conductive member is stored in a high-temperature high-humidity environment (for example, an environment of 45° C. and 85% RH), the anti-aging agent bleeds to the surface of the conductive elastic layer, the phenol-based anti-aging agent is preferably used as the anti-aging agent. In particular, the bisphenol-based anti-aging agent is more preferably used.

For example, when the conductive elastic layer is stored in the state of being in contact with an image holding member, the bleeding may cause a stripe-shaped image defect in the image subsequently formed. However, by suppressing the bleeding, the stipe-shaped image defect due to the bleeding can be suppressed.

The molecular weight of the anti-aging agent is not particularly limited, but is preferably 220 or more and more preferably 250 or more from the viewpoint of suppressing the bleeding. The upper limit of the molecular weight of the anti-aging agent is not particularly limited, but is, for example, 700 or less.

The amount of the anti-aging agent added is, for example, within a range of 0.3 parts by mass or more and 10 parts by mass or less relative to 100 parts by mass of the elastic material. From the viewpoint of suppressing both an increase in resistance and the bleeding, the amount is preferably 1 part by mass or more and 8 parts by mass or less and more preferably 2 parts by mass or more and 7 parts by mass or less.

—Ionic Conductive Agent—

Examples of the ionic conductive agent include quaternary ammonium salts (for example, perchlorates, chlorates, fluoroboric acid salts, sulfuric acid salts, ethosulfate salts, benzyl bromide salts, or benzyl chloride salts of lauryltrimethylammonium, stearyltrimethylammonium, octadodecyltrimethylammonium, dodecyltrimethylammonium, hexadecyltrimethylammonium, or modified fatty acid-dimethylethylammonium), fatty acid sulfonic acid salts, higher alcohol sulfuric acid ester salts, higher alcohol ethylene oxide-added sulfuric acid ester salts, higher alcohol phosphoric acid ester salts, higher alcohol ethylene oxide-added phosphoric acid ester salts, betaine, higher alcohol ethylene oxide, polyethylene glycol fatty acid esters, polyhydric alcohol fatty acid esters, and the like. These ionic conductive agents may be used alone or in combination of two or more.

The content of the ionic conductive agent is 0.1 parts by mass or more and 5.0 parts by mass or less and more preferably 0.5 parts by mass or more and 3.0 parts by mass or less relative to 100 parts by mass of the elastic material.

—Other Additives—

Examples of other additives include materials which can be generally added to an elastic layer, such as a softening agent, a plasticizer, a curing agent, a vulcanizing agent, a vulcanization accelerator, an antioxidant, a surfactant, a coupling agent, a filler (silica, calcium carbonate, or the like), and the like.

—Characteristics of Conductive Elastic Layer—

The surface roughness Rz of the conductive substrate-side surface (also referred to as the "inner peripheral surface" hereinafter) of the conductive elastic layer is 7 μm or more and 30 μm or less (or 10 μm or more and 20 μm or less). The conductive elastic layer having the inner peripheral surface with a surface roughness Rz within this range is useful in that the shape is little changed after storage at high temperature and high humidity. On the other hand, conductivity at the interface between the conductive elastic layer and the conductive substrate is decreased, thereby increasing the tendency of the resistance of the conductive member to decrease. However, even if the inner peripheral surface of the conductive elastic layer has a surface roughness Rz within the range described above, an increase in resistance of the conductive member according to the exemplary embodiment can be easily suppressed when a current with the same polarity is repeatedly applied.

When the conductive elastic layer is a foamed elastic layer, the surface roughness Rz of a skin layer formed on the inner peripheral surface of the conductive elastic layer is considered as the surface roughness Rz of the inner peripheral surface of the conductive elastic layer.

A method for adjusting the surface roughness Rz of the inner peripheral surface of the conductive elastic layer within the range is, for example, as follows. A conductive substrate having an outer peripheral surface with surface roughness Rz is prepared, which is imparted with the target surface roughness Rz of the inner peripheral surface of the conductive elastic layer. Next, the conductive elastic layer is extrusion-molded on the outer peripheral surface of the conductive substrate. Next, air is blown into from an end of the conductive substrate with the conductive elastic layer, and the cylindrical conductive elastic layer is removed. Next, another conductive substrate is inserted into the cylindrical conductive elastic layer removed.

A method for measuring the surface roughness Rz of the inner peripheral surface of the conductive elastic layer is as follows.

Two cuts are formed in the conductive elastic layer along the axial direction of the conductive member so as to reach the conductive substrate. The conductive elastic layer between the two cuts is slowly separated from the conductive substrate so that the surface shape of the conductive elastic layer is not changed, forming a measurement sample. The surface roughness Rz of the surface corresponding to the inner peripheral surface of the conductive elastic layer in the measurement sample is measured along the direction corresponding to the axial direction of the conductive member.

The surface roughness Rz may be measured by the following method. Air is blown into the conductive member from an end thereof. Next, the conductive elastic layer having a hole formed in a central portion is removed from the conductive substrate. Next, the removed cylindrical conductive elastic layer is cut open in halves. The surface roughness Rz of the surface corresponding to the inner peripheral surface of the cut-open conductive elastic layer is measured along the direction corresponding to the axial direction of the conductive member.

In addition, the surface roughness Rz is measured by using a surface roughness meter Surfcom 1400A (manufactured by Tokyo Seimitsu Co., Ltd.) under the conditions including an evaluation length Ln of 4 mm, a reference length L of 0.8 mm, and a cut-off value of 0.8 mm according to JIS B0601-1994.

The thickness of the conductive elastic layer is preferably 1 mm or more and 10 mm or less and more preferably 2 mm or more and 5 mm or less.

The volume resistivity of the conductive elastic layer is preferably $10^3$ Ωcm or more and $10^{14}$ Ωcm or less.

(Surface Treated Layer)

The surface treated layer is, for example, a layer formed by impregnating the surface layer of the elastic layer with a resin or the like (that is, a surface treated layer formed by impregnating bubbles with a resin or the like in the surface layer of the elastic layer containing).

The surface treated layer is a layer formed by impregnating the surface layer of the elastic layer with a surface treatment solution containing an isocyanate compound and then curing the surface treatment solution (isocyanate).

The surface treated layer is formed integrally with the surface layer of the elastic layer so as to be gradually sparse from the surface to the inside. The surface treated layer suppresses the transfer of contaminants such as a plasticizer and the like to the surface of a charging member, resulting in the charging member having low contamination of the image holding member.

The surface treatment solution used for forming the surface treated layer is, for example, a surface treatment solution containing an isocyanate compound, an organic solvent, and, if required, a conductive agent.

Examples of the isocyanate compound include 2,6-tolylene diisocyanate (TDI), 4,4'-diphenylmethane diisocyanate (MDI), paraphenylene diisocyanate (PPDI), 1,5-naphthalene diisocyanate (NDI), 3,3-dimethyldiphenyl-4,4'-diisocyanate (TODI), polymers and modified products thereof, and the like.

Examples of the conductive agent include powders of carbon black such as Ketjen black, acetylene black, and the like; pyrolytic carbon, graphite; metals or alloys such as aluminum, copper, nickel, stainless steel, and the like; conductive metal oxides such as tin oxide, indium oxide, titanium oxide, tin oxide-antimony oxide solid solution, tin oxide-indium oxide solid solution, and the like; materials produced by conductive treatment of surfaces of insulating materials; and the like. Among these, carbon black is preferred as the conductive agent.

The conductive agents may be used alone or in combination of two or more.

The content of the conductive agent is 2% by mass or more and 40% by mass or less relative to the isocyanate compound. When the content of the conductive agent falls in the range, effective charging characteristics are easily exhibited. Also, separation of the conductive agent from the surface treated layer is suppressed.

Examples of the organic solvent include, but are not limited to, organic solvents such as ethyl acetate, methyl ethyl ketone (MEK), toluene, and the like.

Examples of a method for impregnating the surface layer of the elastic layer with the surface treatment solution include a method of immersing the conductive substrate with the elastic layer in the surface treatment solution, a method of spraying the surface treatment solution on the elastic layer by using a spray or the like, and the like. The immersion time in the surface treatment solution, the number of times of spraying with a spray, or the amount of the surface treatment solution may be properly adjusted.

In addition, a surface layer may be provided in place of the surface treated layer. For example, the surface layer is a layer provided independently on the elastic layer and containing a resin. If required, the surface layer may contain other additives or the like.

—Resin—

Examples of the resin include an acrylic resin, a fluorine-modified acrylic resin, a silicone-modified acrylic resin, a cellulose resin, a polyamide resin, copolymer nylon, a polyurethane resin, a polycarbonate resin, a polyester resin, a polyimide resin, an epoxy resin, a silicone resin, a polyvinyl alcohol resin, a polyvinyl butyral resin, a polyvinyl acetal resin, an ethylene tetrafluoroethylene resin, a melamine resin, a polyethylene resin, a polyvinyl resin, a polyarylate resin, a polythiophene resin, a polyethylene terephthalate resin (PET), fluorocarbon resins (a polyvinylidene fluoride resin, a tetrafluoroethylene resin, a tetrafluoroethylene-perfluoroalkyl vinyl ether copolymer (PFA), a tetrafluoroethylene-hexafluoropropylene copolymer (FEP), and the like), and the like. The resin is preferably produced by curing or crosslinking a curable resin with a curing agent or a catalyst.

The copolymer nylon is a copolymer containing as a polymerization unit any one or plural ones of 610 nylon, 11 nylon, and 12 nylon. The copolymer nylon may contain another polymerization unit such as 6 nylon, 66 nylon, or the like.

Among these, from the viewpoint of suppressing contamination of the surface layer, a polyvinylidene fluoride resin, a tetrafluoroethylene resin, and a polyamide resin are preferred as the resin, and the polyamide resin is more preferred. The polyamide resin causes little frictional charging due to contact with a body to be charged (for example, the image holding member) and thus the adhesion of toner and an external additive is easily suppressed.

Examples of the polyamide resin include polyamide resins described in "Polyamide Resin Handbook", Osamu Fukumoto (Nikkan Kogyo Shinbun, Ltd.). Among these, from the viewpoint of suppressing contamination of the surface layer 316, alcohol-soluble polyamide is particularly preferred as the polyamide resin, alkoxymethylated polyamide (alkoxymethylated nylon) is more preferred, and methoxymethylated polyamide (methoxymethylated nylon) is still more preferred.

In addition, from the viewpoint of improving the mechanical strength of the surface layer and suppressing the occurrence of a crack in the surface layer, the resin may have a crosslinked structure.

—Other Additives—

Examples of other additives include known additives which can be generally added to the surface layer, such as a conductive agent, a filler, a curing agent, a vulcanizing agent, a vulcanization accelerator, an antioxidant, a surfactant, a coupling agent, and the like.

The thickness of the surface layer is, for example, preferably 0.01 μm or more and 1000 μm or less and more preferably 2 μm or more and 25 μm or less.

The thickness of the surface layer is a value measured by the following method. A sample cut out from the surface layer is used, a section of the surface layer is measured at 10 points by using an electron microscope, and an average value is calculated.

The volume resistivity of the surface layer is preferably within a range of $10^3$ Ωcm or more and $10^{14}$ Ωcm or less.

The volume resistivity of the surface layer is a value measured by the same method as for the volume resistivity of the elastic layer.

(Application)

The conductive member according to the exemplary embodiment is used for a member for an electrophotographic image forming apparatus (a charging member which charges an image holding member, a transfer member which transfers a toner image to a recording medium or an intermediate transfer body, a recording medium transport member, an intermediate transfer body, or the like). The conductive member may be used for a member other than that for an electrophotographic image forming apparatus (a charging member which charges a body to be charged, a transfer member which transfers a transferred material to a transfer body, or the like).

[Image Forming Apparatus/Charging Device/Transfer Device/Process Cartridge]

An image forming apparatus according to an exemplary embodiment of the present invention includes an image holding member, a charging device which charges the surface of the image holding member, an electrostatic latent image forming device which forms an electrostatic latent image on the charged surface of the image holding member, a developing device which develops the electrostatic latent image formed on the surface of the image holding member with a developer containing a toner to form a toner image, and a transfer device which transfers the toner image to the surface of a recording medium.

The charging device used is a charging device (a charging device according to an exemplary embodiment of the present invention) including the conductive member according to the exemplary embodiment as a charging member which charges an image holding member (an example of a body to be charged).

Also, the transfer device used is a transfer device (a transfer device according to an exemplary embodiment of the present invention) including the conductive member according to the exemplary embodiment as a transfer member which transfers a toner image (an example of a transferred material) to a recording medium (an example of a transfer body).

On the other hand, a process cartridge according to an exemplary embodiment of the present invention includes, for example, at least one of a charging device which is detachable from the image forming apparatus having the configuration described above and which charges the surface of the image holding member, and a transfer device which transfers a toner image to the surface of a recording medium. The charging device according to the exemplary embodiment is applied to the charging device, and the transfer device according to the exemplary embodiment is applied to the transfer device.

If required, the process cartridge according to the exemplary embodiment may include, for example, at least one selected from the group including an image holding member, an electrostatic latent image forming device which forms an electrostatic latent image on the charged surface of the image holding member, a developing device which develops the latent image formed on the surface of the image holding member with a toner to form a toner image, a transfer device which transfers the toner image formed on the surface of the image holding member to a recording medium, and a cleaning device which cleans the surface of the image holding member.

Next, the image forming apparatus and process cartridge according to the exemplary embodiment are described with reference to the drawings.

Figure 3:
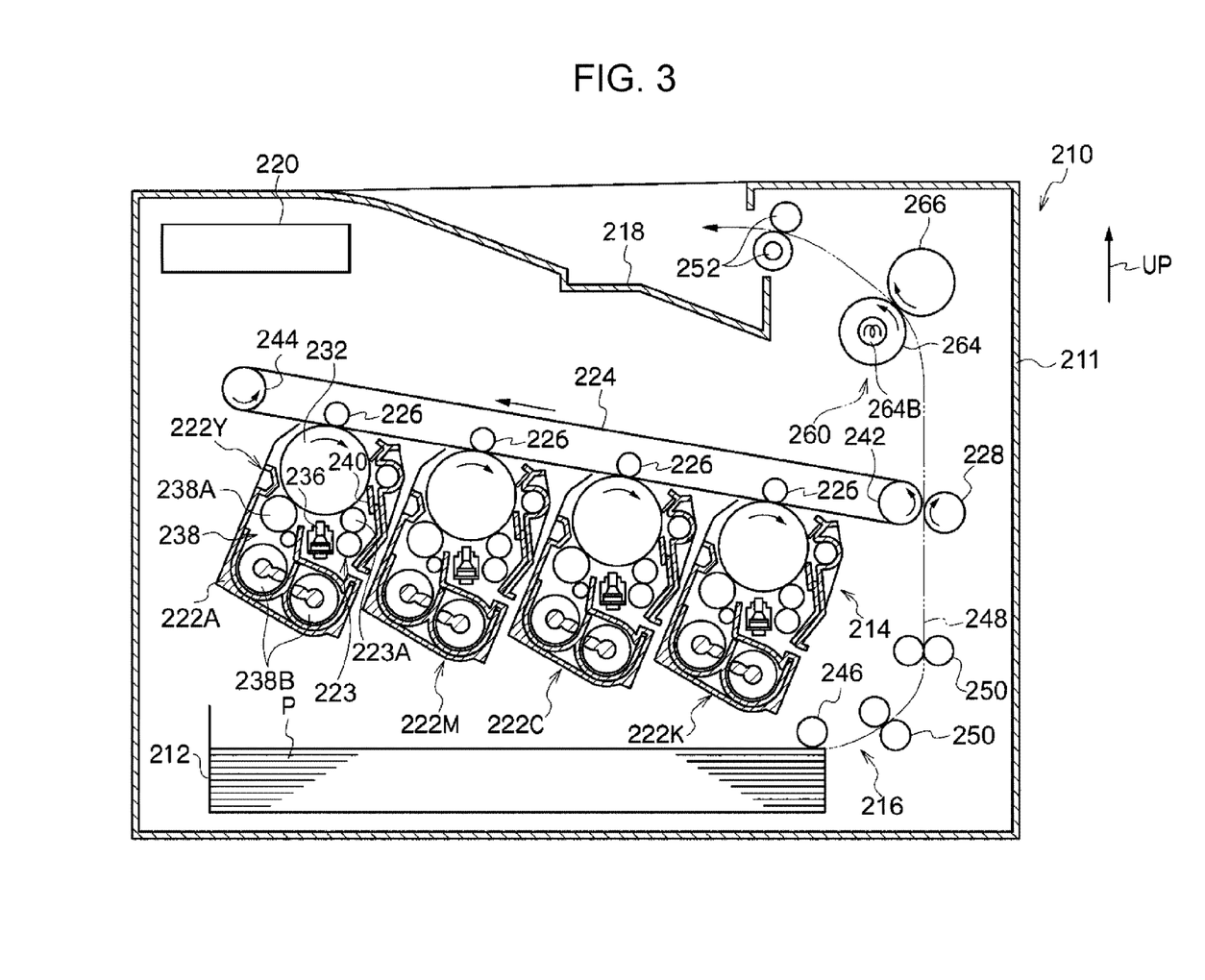
FIG. 3 is a schematic configuration diagram showing an example of an image forming apparatus according to an exemplary embodiment of the present invention.

FIG. 3 is a schematic configuration diagram showing the image forming apparatus according to the exemplary embodiment. In the figure, an arrow "UP" indicates an upper portion in the vertical direction.

As shown in FIG. 3, an image forming apparatus 210 includes an image forming apparatus body 211 in which components are housed. In the image forming apparatus body 211, provided are a housing part 212 which houses a recording medium P such as paper or the like, an image forming part 214 which forms an image on the recording medium P, a transport part 216 which transports the recording medium P from the housing part 212 to the image forming part 214, and a controller 220 which controls the operation of each of the parts of the image forming apparatus 210. Also, a discharge part 218 to which the recording medium P having an image formed by the image forming part 214 is discharged is provided in an upper portion of the image forming apparatus body 211.

The image forming part 214 includes image forming units 222Y, 222M, 222C, and 222K (referred to as "222Y to 222K" hereinafter) which form toner images of colors of yellow (Y), magenta (M), cyan (C), and black (K), respectively, an intermediate transfer belt 224 (an example of a transfer material) to which the toner images formed in the image forming units 222Y to 222K are transferred, first transfer rollers 226 (an example of transfer rollers) which transfer the toner images formed by the image forming units 222Y to 222K to the intermediate transfer belt 224, and a second transfer roller 228 (an example of a transfer member) which transfers the toner images, which have been transferred to the intermediate transfer belt 224 by the first transfer rollers 226, from the intermediate transfer belt 224 to the recording medium P. The image forming part 214 is not limited to the configuration described above and may have another configuration as long as an image is formed on the recording medium P (an example of a transfer material).

A unit including the intermediate transfer belt 224, the first transfer rollers 226, and the second transfer roller 228 corresponds to an example of the transfer device. The unit may be configured as a cartridge (process cartridge.

The image forming units 222Y to 222K are arranged in a state inclined from the horizontal direction so as to line up in a vertical direction central portion of the image forming apparatus 210. Each of the image forming units 222Y to 222K has a photoreceptor 232 (an example of the image holding member) which rotates in a direction (for example, the clockwise direction in FIG. 3). The image forming units 222Y to 222K have the same configuration and thus, in FIG. 3, the reference numerals of the parts of each of the image forming units 222M, 222C, and 222K are omitted.

Around each of the photoreceptors 232, there are provided, in order from the upstream side in the rotational direction of the photoreceptor 232, a charging device 223 including a charging roller 223A (an example of the charging member) which charges the photoreceptor 232, an exposure device 236 (an example of the electrostatic latent image forming device) which forms an electrostatic latent image on the photoreceptor 232 by exposure of the photoreceptor 232 charged by the charging device 223, a developing device 238 which develops the latent image formed on the photoreceptor 232 by the exposure device 236 to form a toner image, and a removing member (a cleaning blade or the like) 240 which is in contact with the photoreceptor 232 and removes the toner remaining on the surface of the photoreceptor 232.

The photoreceptor 232, the charging device 223, the exposure device 236, the developing device 238, and the removing member 240 are integrally held by a housing 222A to form a cartridge (process cartridge).

A self-scanning LED print head is applied to the exposure device 236. The exposure device 236 may be an exposure device of an optical system in which the photoreceptor 232 is exposed by a light source through a polygon mirror.

The exposure device 236 forms a latent image based on an image signal sent from the controller 220. The image signal sent from the controller 220 is, for example, an image signal acquired from an external device by the controller 220.

The developing device 238 includes a developer supply body 238A which supplies the developer to the photoreceptor 232 and plural transport members 238B which transport, while stirring, the developer added to the developer supply body 238A.

The intermediate transfer belt 224 is formed in a circular shape and disposed above the image forming units 222Y to 222K. The intermediate transfer belt 224 is wound on winding rolls 242 and 244 provided on the inner side of the intermediate transfer belt 224. When any one of the winding rolls 242 and 244 is rotatively driven, the intermediate transfer belt 224 circularly moves (rotates) in a direction (for example, the counter-clockwise direction in FIG. 3) while being in contact with the photoreceptors 232. The winding roll 242 is a counter roll facing the second transfer roller 228.

The first transfer roller 226 faces each of the photoreceptors 232 with the intermediate transfer belt 224 disposed therebetween. The space between the first transfer roller 226 and each of the photoreceptors 232 serves as a first transfer position where the toner image formed on each of the photoreceptors 232 is transferred to the intermediate transfer belt 224.

The second transfer roller 228 faces the winding roll 242 with the intermediate transfer belt 224 disposed therebetween. The space between the second transfer roller 228 and the winding roll 242 serves as a second transfer position where the toner images transferred to the intermediate transfer belt 224 are transferred to the recording medium P.

The transport part 216 includes a delivery roller 246 which delivers the recording medium P housed in the housing part 212, a transport path 248 through which the recording medium P delivered by the delivery roller 246 is transported, and plural transport rollers 250 which are disposed along the transport path 248 to transport the recording medium P delivered by the deliver roller 246 to the second transfer position.

Further, a fixing device 260 which fixes the toner image formed on the recording medium P by the image forming part 214 to the recording medium P is provided on the downstream side of the second transfer position in the transport direction.

The fixing device 260 includes a heating roller 264 which heats the image on the recording medium P and a pressure roller 266 as an example of a pressure member. A heating source 264B is provided in the heating roller 264.

Further, a discharge roller 252 which discharges the recording medium P having the toner image fixed thereto to the discharge part 218 is provided on the downstream side of the fixing device 260 in the transport direction.

Next, the image forming operations of forming an image on the recording medium P in the image forming apparatus 210 are described.

In the image forming apparatus 210, the recording medium P delivered from the housing part 212 by the delivery roller 246 is sent to the second transfer position by the plural transport rollers 250.

In each of the image forming units 222Y to 222K, the photoreceptor 232 charged by the charging device 223 is exposed by the exposure device 236 to form a latent image on the photoreceptor 232. The latent image is developed by the developing device 238 to form a toner image on the photoreceptor 232. The toner images of respective colors formed in the image forming units 222Y to 222K are superposed on the intermediate transfer belt 224 at the first transfer positions, forming a color image. The color image formed on the intermediate transfer belt 224 is transferred to the recording medium P at the second transfer position.

The recording medium P to which the toner images have been transferred is transported to the fixing device 260, and the transferred toner images are fixed by the fixing device 260. The recording medium P on which the toner images have been fixed is discharged to the discharge part 218 by the discharge roller 152. A series of image forming operations is performed as described above.

The image forming apparatus 210 according to the exemplary embodiment is not limited to the configuration described above, and examples which may be applied include known image forming apparatuses such as an image forming apparatus of a direct transfer system in which the toner images formed on the photoreceptors 232 of the image forming units 222Y to 222K are transferred directly to the recording medium P, and the like.

EXAMPLES

The present invention is described in further detail below by giving examples. However, the present invention is not limited to these examples. In description below, "parts" and "%" are on a mass basis unless otherwise specified.

Example 1

(Production of Elastic Roller)

A mixture described below is kneaded by an open roller to prepare a rubber kneaded material A. Then, the rubber kneaded material A and a SUS-made shaft having a surface roughness Rz of 0.8 μm and a diameter of 6 mm are simultaneously extruded to form a cylindrical roller. Next, the cylindrical roller is vulcanized by heating at 160° C. for 30 minutes.

Next, rubber after vulcanization is taken out by blowing air into the shaft of the cylindrical roller and then cut into a length of 224 mm.

Next, a SUS-made shaft (an example of the conductive substrate) having a surface roughness Rz of 0.4 μm and a diameter of 6 mm is inserted into a hole at the central portion of the rubber vulcanized, and the outer peripheral surface of the roller is polished to form an elastic roller (roller having a conductive elastic layer formed on the outer peripheral surface of the shaft) having an outer diameter of 9 mm (elastic layer thickness: 1.5 mm).

—Composition of Mixture—

| | |
|---|---|
| Rubber material (epichlorohydrin-ethylene oxide-ally glycidyl ether copolymer rubber: CG102: manufactured by Osaka Soda Co., Ltd., 60%, nitrile acrylobutadiene rubber: N230SV: 40%: manufactured by JSR Corporation) | 100 pasts by mass |
| Carbon black (#55: manufactured by Asahi Carbon Co., Ltd.) | 15 parts by mass |
| Vulcanizing agent (sulfur) 200 mesh: manufactured by Tsurumi Chemical Industry Co., Ltd. | 1 part by mass |
| Vulcanization accelerator (Nocceler DM: manufactured by Ouchi Shinko Chemical Industrial Co., Ltd.) | 1.5 parts by mass |
| Vulcanization accelerator (Nocceler TET: manufactured by Ouchi Shinko Chemical Industrial Co., Ltd.) | 1.0 parts by mass |
| Zinc oxide (zinc flower No. 1: manufactured by Seido Chemical Industry Co., Ltd.) | 5 parts by mass |
| Calcium carbonate (Whiton SSB: Shiraishi Calcium Co., Ltd.) | 10 parts by mass |
| Stearic acid (stearic acid S: manufactured by Kao Corporation) | 1 part by mass |
| Anti-aging agent (Nocrac 300: manufactured by Ouchi Shinko Chemical Industrial Co., Ltd., compound name: 4,4'-thiobis(3-methyl-6-tert-butylphenol)) (Washing of elastic roller) | 3 parts by mass |

Next, the elastic roller after polishing is washed for 40 minutes in an ultrasonic washing machine in which pure water (20° C.) of 1 μS/cm is placed, taken out from the water, rotated at 120 rpm for 1 minute, and then dried in an oven of 105° C. for 15 minutes.

(Formation of Surface Treated Layer)

After washing, the elastic roller is immersed for 15 minutes in an isocyanate compound solution (manufactured by Sumitomo Bayern Co., Ltd.: Bayhydur 3100). Then, the elastic roller is dried at room temperature for 15 minutes and dried at 140° C. for 15 minutes in a drying furnace. As a result, a surface treated layer is formed on the surface layer of the elastic layer.

A conductive roller is produced through the process described above.

Example 2

A conductive roller is produced by the same method as in Example 1 except that the washing time of an elastic roller is 20 minutes.

Example 3

A conductive roller is produced by the same method as in Example 1 except that the washing time of an elastic roller is 60 minutes.

Example 4

A conductive roller is produced by the same method as in Example 1 except that the washing time of an elastic roller is 100 minutes.

Example 5

A conductive roller is produced by the same method as in Example 1 except that the washing time of an elastic roller is 10 minutes, and the amount of the anti-aging agent added is 0.3 parts by mass.

Example 6

A conductive roller is produced by the same method as in Example 1 except that the washing time of an elastic roller is 10 minutes, and the amount of the anti-aging agent added is 1 part by mass.

Example 7

A conductive roller is produced by the same method as in Example 1 except that the washing time of an elastic roller is 20 minutes, and the amount of the anti-aging agent added is 5 parts by mass.

Example 8

A conductive roller is produced by the same method as in Example 1 except that the amount of the anti-aging agent added is 8 parts by mass.

Example 9

A conductive roller is produced by the same method as in Example 1 except that the amount of the anti-aging agent added is 10 parts by mass.

Example 10

A conductive roller is produced by the same method as in Example 1 except that the type of the anti-aging agent is changed to Nocrac 200 (manufactured by Ouchi Shinko Chemical Industrial Co., Ltd., compound name: 2,6-di-tert-butyl-4-methylphenol) and the amount of the anti-aging agent added is 8 parts by mass.

Example 11

A conductive roller is produced by the same method as in Example 1 except that the type of the anti-aging agent is changed to Nocrac DAH (manufactured by Ouchi Shinko Chemical Industrial Co., Ltd., compound name: 2,5-di-tert-amylhydroquinone) and the amount of the anti-aging agent added is 5 parts by mass.

Example 12

A conductive roller is produced by the same method as in Example 1 except that the washing time of an elastic roller is 3 minutes and the amount of the anti-aging agent added is 1 part by mass.

Example 13

A conductive roller is produced by the same method as in Example 1 except that the washing time of an elastic roller is 10 minutes.

Example 14

A conductive roller is produced by the same method as in Example 1 except that the washing time of an elastic roller is 80 minutes.

Example 15

A conductive roller is produced by the same method as in Example 1 except that the washing time of an elastic roller is 10 minutes and the amount of the anti-aging agent added is 0.1 parts by mass.

Example 16

A conductive roller is produced by the same method as in Example 1 except that the washing time of an elastic roller is 20 minutes and the amount of the anti-aging agent added is 13 parts by mass.

Example 17

A conductive roller is produced by the same method as in Example 1 except that the washing time of the elastic roller is 10 minutes, the type of the anti-aging agent is changed to Nocrac PA (manufactured by Ouchi Shinko Chemical Industrial Co., Ltd., compound name: N-phenyl-1-naphthylamine) and the amount of the anti-aging agent added is 10 parts by mass.

Example 18

A conductive roller is produced by the same method as in Example 1 except that the washing time of the elastic roller is 10 minutes, the type of the anti-aging agent is changed to Nocrac CD (manufactured by Ouchi Shinko Chemical Industrial Co., Ltd., compound name: 4,4'-bis($\alpha,\alpha$-dimethylbenzyl)diphenylamine) and the amount of the anti-aging agent added is 10 parts by mass.

Example 19

A conductive roller is produced by the same method as in Example 1 except that the washing time of the elastic roller is 10 minutes, the type of the anti-aging agent is changed to Nocrac MBZ (manufactured by Ouchi Shinko Chemical Industrial Co., Ltd., compound name: 2-mercaptobenzimidazole zinc salt), and the amount of the anti-aging agent added is 10 parts by mass.

Comparative Example 1

A conductive roller is produced by the same method as in Example 1 except that washing of the elastic roller is not performed, and the amount of the anti-aging agent added is 0.3 parts by mass.

Comparative Example 2

A conductive roller is produced by the same method as in Example 1 except that the washing time of the elastic roller is 10 minutes, and the anti-aging agent is not added.

Comparative Example 3

A conductive roller is produced by the same method as in Example 1 except that washing of the elastic roller is not performed, and the anti-aging agent is not added.

Comparative Example 4

A conductive roller is produced by the same method as in Example 1 except that the washing time of the elastic roller is 120 minutes.

Comparative Example 5

A rubber kneaded material B is prepared by the same method as for the rubber kneaded material A except that the anti-aging agent is not added. A conductive roller is produced by the same method as in Example 1 except that the rubber kneaded material B and a SUS-made shaft having a surface roughness Rz of 3.0 μm and a diameter of 6 mm are simultaneously extruded, and the elastic roller is not washed.

Comparative Example 6

A conductive roller is produced by the same method as in Comparative Example 5 except that the surface roughness Rz of 3.0 μm of a SUS-made shaft to be extruded simultaneously with the rubber kneaded material B is changed to 0.6 μm.

Reference Example 1

A conductive roller is produced by the same method as in Comparative Example 3, except using a rubber kneaded material A prepared by adding two types of carbon black (trade name: granular acetylene black: manufactured by Denka Company Limited: 10 parts by mass, trade name: Asahithermal FT: manufactured by Asahi Carbon Co., Ltd.: 50 parts by mass) in place of carbon black (#55: manufactured by Asahi Carbon Co., Ltd.).

<Measurement>

With respect to the conductive roller produced in each of the examples, the following items are measured by the methods described above: 1) the amount of free chlorine ions in the conductive elastic layer (described as "Amount of chlorine ions" in the elastic layer), 2) surface roughness Rz of the inner peripheral surface of the conductive elastic layer (described as "Rz of inner peripheral surface" in tables), and 3) the difference (described as "Environmental dependence" in tables) between the volume resistivity of the conductive elastic layer after storage of the conductive roller for 10 hours in a high-temperature high-humidity environment (environment of 35° C. and 85% RH) and the volume resistivity of the conductive elastic layer after storage of the conductive roller for 10 hours in a low-temperature low-humidity environment (15° C. and 10% RH).

Also, adhesion (described as "Adhesion" in tables) between the shaft and the conductive elastic layer in the conductive roller is measured as follows.

A cut is formed in the circumferential direction at a positon of 20 mm from an end of the roller, and thus rubber of 20 mm at the end is made independent from the other rubber portion. Then, an adhesive is applied to the inner side of a metal collar having the same inner diameter as the outer diameter of the roller and a width of 20 mm, and the collar is placed on the 20-mm independent rubber at the end and allowed to stand for one day until the adhesive is dried. Then, the metal collar is rotated while the shaft is fixed, and the load at the start of movement of the metal collar is measured by a torque limiter.

<Evaluation A>

(Change in Resistance of Conductive Roller)

The resistance value of the conductive roller is measured before (initial) and after (over time) actual-apparatus evaluation A1 (evaluation of density unevenness) is carried out.

The resistance value of the conductive roller is measured as follows.

The conductive roller is placed on a metal plate in an environment at a temperature of 22° C. and a humidity of 55% RH and put into a state in which a load of 500 g is applied to both ends of the shaft. In this state, a current value I (A) is read 10 seconds after an applied voltage of 1000 V is applied between the shaft and the metal plate, and a resistance value (R) is calculated by the formula "R=V/I". The measurement and calculation are performed at four points while the conductive roller is rotated by every 90° in the circumferential direction, and the average value is considered as the resistance value of the conductive roller.

The tables show the common logarithm of initial resistance value, the common logarithm of over-time resistance value, and the difference ("Difference between initial and over-time values" in the tables) between the common logarithms of the initial and over-time resistance values.

(Actual-apparatus Evaluation A1 (Evaluation of Density Unevenness))

The conductive roller of each of the examples is mounted as a charging roller on an evaluation apparatus "DocuPrint CP400d: manufactured by Fuji Xerox Co., Ltd.".

A test of outputting a halftone image with an image density of 20% on 200,000 sheets of A4 paper is carried out by using the evaluation apparatus (a test of outputting on 100,000 sheets in an environment of 28° C. and 85% RH and then outputting on 100,000 sheets in an environment of 10° C. and 15% RH). Then, visual observation is made of the presence of density unevenness in the image output on the 100,000th sheet in an environment of 10° C. and 15% RH (that is, the image output on the 200,000th sheet in total), and evaluation is made based on the following criteria.

A: No density unevenness
B: Slight density unevenness
C: Density unevenness within an acceptable range
D: Unacceptable density unevenness (Actual-apparatus Evaluation A2 (Evaluation of Leakage Property))

The conductive roller 1 used as a charging roller is mounted, together with a photoreceptor having a hole of 0.15 mm in diameter formed to reach an aluminum substrate, on a color copying machine DocuPrint CP400d: manufactured by Fuji Xerox Co., Ltd., and an image is output. Black spots on the image due to the occurrence of leakage are determined based on the following criteria.

A: Black spots with a diameter of less than 0.5 mm
B: Black spots with a diameter of 0.5 mm or more and less than 1.0 mm
C: Black spots with a diameter of 1.0 mm or more and less than 2.0 mm
D: Black spots with a diameter of 2.0 mm or more (Evaluation of Storage Property of Conductive Roller)

The conductive roller is allowed to stand and stored in the state of being in contact with a photoreceptor for 1 month in an environment of 45° C. and 95% RH. The conductive roller after storage is mounted as a charging roller on an evaluation apparatus "DocuPrint CP400d: manufactured by Fuji Xerox Co., Ltd".

A halftone image with an image density of 30% is output on 10 sheets of A4 paper by using the evaluation apparatus in an environment of 22° C. and 55% RH. The presence of stripe image defects is visually observed for images on the 1st to 10th sheets and evaluated based on the following criteria.

A: No stripes are observed.
B: Slight stipes are visually observed.
C: Stripes are observed within an acceptable range.
D: Unacceptable stripes are observed.

TABLE 1

|  |  |  | Example 1 | Example 2 | Example 3 | Example 4 | Example 5 | Example 6 | Example 7 |
|---|---|---|---|---|---|---|---|---|---|
| Elastic layer | Washing time | Minutes | 40 | 20 | 60 | 100 | 10 | 10 | 20 |
|  | Amount of chlorine ions | μg/g | 20 | 40 | 10 | 1 | 60 | 60 | 40 |
|  | Type of anti-aging agent |  | Nocrac 300 bisphenol-based | Nocrac 300 bisphenol-based | Nocrac 300 bisphenol-based | Nocrac 300 bisphenol-based | Nocrac 300 bisphenol-based | Nocrac 300 bisphenol-based | Nocrac 300 bisphenol-based |
|  | Molecular weight of anti-aging agent |  | 358.55 | 358.55 | 358.55 | 358.55 | 358.55 | 358.55 | 358.55 |
|  | Amount of anti-aging agent added | Parts by mass | 3 | 3 | 3 | 3 | 0.3 | 1 | 5 |
|  | Rz of inner peripheral surface | μm | 3.3 | 3.3 | 3.3 | 3.3 | 3.3 | 3.3 | 3.3 |
|  | Environmental dependence | logΩcm | 1.73 | 1.67 | 1.80 | 1.94 | 1.63 | 1.63 | 1.67 |
|  | Adhesion | N · m | 300 | 300 | 300 | 300 | 300 | 300 | 300 |
| Change in resistance of conductive roller | Initial | logΩ | 7.1 | 7.1 | 7.1 | 7.2 | 7.1 | 7.1 | 7.1 |
|  | Over-time | logΩ | 7.5 | 7.4 | 7.2 | 7.3 | 7.8 | 7.6 | 7.4 |
|  | Difference between initial and over-time values | logΩ | 0.4 | 0.3 | 0.1 | 0.1 | 0.7 | 0.5 | 0.3 |
| Evaluation | Actual-apparatus evaluation A1 (density unevenness) |  | A | A | A | A | C | B | A |
|  | Actual-apparatus evaluation A2 (leakage) |  | A | A | A | C | A | A | A |
|  | Storage property of conductive roller |  | A | A | A | A | A | A | A |

TABLE 2

|  |  |  | Example 8 | Example 9 | Example 10 | Example 11 | Example 12 | Example 13 | Example 14 |
|---|---|---|---|---|---|---|---|---|---|
| Elastic layer | Washing time | Minutes | 40 | 40 | 40 | 40 | 3 | 10 | 80 |
|  | Amount of chlorine ions | μg/g | 20 | 20 | 20 | 20 | 80 | 60 | 5 |
|  | Type of anti-aging agent |  | Nocrac 300 bisphenol-based | Nocrac 300 bisphenol-based | Nocrac 200 monophenol-based | Nocrac DAH polyphenol-based | Nocrac 300 bisphenol-based | Nocrac 300 bisphenol-based | Nocrac 300 bisphenol-based |
|  | Molecular weight of anti-aging agent |  | 358.55 | 358.55 | 220.36 | 250.38 | 358.55 | 358.55 | 358.55 |
|  | Amount of anti-aging agent added | Parts by mass | 8 | 10 | 8 | 5 | 1 | 3 | 3 |
|  | Rz of inner peripheral surface | μm | 3.3 | 3.3 | 3.3 | 3.3 | 3.3 | 3.3 | 3.3 |
|  | Environmental dependence | logΩcm | 1.73 | 1.73 | 1.73 | 1.73 | 1.61 | 1.63 | 1.87 |
|  | Adhesion | N · m | 300 | 300 | 300 | 300 | 300 | 300 | 300 |
| Change in resistance of conductive roller | Initial | logΩ | 7.2 | 7.2 | 7.1 | 7.1 | 7.1 | 7.1 | 7.2 |
|  | Over-time | logΩ | 7.3 | 7.3 | 7.6 | 7.6 | 7.7 | 7.6 | 7.4 |
|  | Difference between initial and over-time values | logΩ | 0.1 | 0.1 | 0.5 | 0.5 | 0.6 | 0.5 | 0.2 |
| Evaluation | Actual-apparatus evaluation A1 (density unevenness) |  | A | A | B | B | C | B | A |
|  | Actual-apparatus evaluation A2 (leakage) |  | A | A | A | A | A | A | B |
|  | Storage property of conductive roller |  | B | C | C | B | A | A | A |

TABLE 3

|  |  |  | Example 15 | Example 16 | Example 17 | Example 18 | Example 19 |
|---|---|---|---|---|---|---|---|
| Elastic layer | Washing time | Minutes | 10 | 20 | 10 | 10 | 10 |
|  | Amount of chlorine ions | μg/g | 60 | 40 | 60 | 60 | 60 |
|  | Type of anti-aging agent |  | Nocrac 300 bisphenol-based | Nocrac 300 bisphenol-based | Nocrac PA amine-based | Nocrac CD amine-based | Nocrac MBZ imidazole-based |

TABLE 3-continued

|  |  |  | Example 15 | Example 16 | Example 17 | Example 18 | Example 19 |
|---|---|---|---|---|---|---|---|
|  | Molecular weight of anti-aging agent |  | 358.55 | 358.55 | 219.28 | 405.57 | 397.88 |
|  | Amount of anti-aging agent added | Parts by mass | 0.1 | 13 | 10 | 10 | 10 |
|  | Rz of inner peripheral surface | μm | 3.3 | 3.3 | 3.3 | 3.3 | 3.3 |
|  | Environmental dependence | logΩcm | 1.63 | 1.67 | 1.63 | 1.63 | 1.63 |
|  | Adhesion | N · m | 300 | 300 | 300 | 300 | 300 |
| Change in resistance of conductive roller | Initial | logΩ | 7.1 | 7.2 | 7.2 | 7.2 | 7.2 |
|  | Over-time | logΩ | 7.9 | 7.5 | 7.7 | 7.7 | 7.7 |
|  | Difference between initial and over-time values | logΩ | 0.8 | 0.3 | 0.5 | 0.5 | 0.5 |
| Evaluation | Actual-apparatus evaluation A1 (density unevenness) |  | C | A | C | C | C |
|  | Actual-apparatus evaluation A2 (leakage) |  | A | A | A | A | A |
|  | Storage property of conductive roller |  | A | D | D | D | D |

TABLE 4

|  |  |  | Comparative Example 1 | Comparative Example 2 | Comparative Example 3 | Comparative Example 4 | Comparative Example 5 | Comparative Example 6 | Reference Example 1 |
|---|---|---|---|---|---|---|---|---|---|
| Elastic layer | Washing time | Minutes | No | 10 | No | 120 | No | No | No |
|  | Amount of chlorine ions | μg/g | 100 | 60 | 100 | Undetectable | 100 | 100 | 100 |
|  | Type of anti-aging agent |  | Nocrac 300 bisphenol-based | No | No | Nocrac 300 bisphenol-based | No | No | No |
|  | Molecular weight of anti-aging agent |  | 358.55 | — | — | 358.55 | — | — | — |
|  | Amount of anti-aging agent added | Parts by mass | 0.3 | — | — | 3 | — | — | — |
|  | Rz of inner peripheral surface | μm | 3.3 | 3.3 | 3.3 | 3.3 | 9.3 | 2.3 | 3.3 |
|  | Environmental dependence | logΩcm | 1.60 | 1.63 | 1.60 | 2.00 | 1.60 | 1.60 | 0.20 |
|  | Adhesion | N · m | 300 | 300 | 300 | 300 | 60 | 360 | 300 |
| Change in resistance of conductive roller | Initial | logΩ | 7.1 | 7.1 | 7 | 7.2 | 7 | 7 | 7.1 |
|  | Over-time | logΩ | 8 | 8.1 | 8.3 | 7.3 | 8.3 | 8.5 | 7.1 |
|  | Difference between initial and over-time values | logΩ | 0.9 | 1 | 1.3 | 0.1 | 1.3 | 1.5 | 0 |
| Evaluation | Actual-apparatus evaluation A1 (density unevenness) |  | D | D | D | A | D | D | A |
|  | Actual-apparatus evaluation A2 (leakage) |  | A | A | A | D | A | A | A |
|  | Storage property of conductive roller |  | A | A | A | A | A | A | A |

The above results indicate that in the conductive roller of each of the examples, a change in resistance of the conductive roller (an increase in resistance generated by repeatedly applying a current with the same polarity) is suppressed as compared with in the conductive rollers of Comparative Examples 1 and 3 in which the conductive elastic layer has a large amount of free chlorine ions and the conductive roller of Comparative Example 2 not containing the anti-aging agent.

In Comparative Example 2 in which the amount of free chlorine ions in the conductive elastic layer is within a range of 1 μg/g or more and 80 μg/g or less and the anti-aging agent is not added, the actual-apparatus evaluation 1 (evaluation of density unevenness) shows evaluation D, while when the presence of density unevenness in the image on the 100,000th sheet output in an environment of 28° C. and 85% RH is visually observed, no density unevenness is observed.

Also, it is found that in the conductive roller of each of the examples, color spots due to charging failure (concentration of charge (leakage)) in a high-temperature high-humidity environment are suppressed as compared with in the conductive roller of Comparative Example 4 in which the conductive elastic layer has a small amount of free chlorine ions. That is, it is found that a decrease in resistance in a high-temperature high-humidity environment is suppressed.

In addition, among the examples, in Examples 1 to 14 each using the phenol-based anti-aging agent and containing the anti-aging agent added in an amount of 10 parts by mass or less relative to 100 parts by mass of the elastic material, the conductive roller has good storage property and bleeding of the anti-aging agent due to storage in a high-temperature high-humidity environment is suppressed as compared with in Example 15 using the anti-aging agent added in an amount of over 10 parts by mass and in Examples 16 to 19 each using another anti-aging agent.

The results of the evaluation A indicate that the conductive roller of each of the examples is useful as a charging roller.

The conductive roller of Reference Example 1 having the conductive elastic layer which exhibits electronic conduction causes little change in resistance (that is, little increase in resistance due to the repeated application of a current with the same polarity) even when the conductive elastic layer contains a large amount of free chlorine ions.

Examples 101 to 119, Comparatve Examples 101 to 106, and Reference Example 101

A conductive roller is produced by the same method as in each of Examples 1 to 19, Comparative Examples 1 to 6, and Reference Example 1 except that 5 parts by mass of a foaming agent (Neocellborn: manufactured by Eiwa Chemical Industry Co., Ltd.) is added to the composition of the mixture for forming the elastic layer, the outer diameter of the roller is 18 mm (elastic layer thickness: 6 mm), and the surface treated layer is not formed.

(Change in Resistance of Conductive Roller)

The resistance value of the conductive roller is measured before (initial) and after (over time) actual-apparatus evaluation B1 (evaluation of white spots) described below is carried out. The resistance value is shown by a common logarithm.

The resistance value of the conductive roller is measured as follows.

The conductive roller is placed on a metal plate in an environment at a temperature of 22° C. and a humidity of 55% RH and put into a state in which a load of 500 g is applied to both ends of the shaft. In this state, a current value I (A) is read 10 seconds after an applied voltage of 1000 V is applied between the shaft and the metal plate, and a resistance value (R) is calculated by the formula "R=V/I". The measurement and calculation are performed at four points while the conductive roller is rotated by every 90° in the circumferential direction, and the average value is considered as the resistance value of the conductive roller.

<Evaluation B>

The conductive roller of each of Examples 101 to 119, Comparative Examples 101 to 106, and Reference Example 101 is evaluated as follows.

(Actual-apparatus Evaluation B1 (Evaluation of White Spots))

The conductive roller of each of the examples is mounted as a second transfer roller on an evaluation apparatus "DocuPrint CP400d: manufactured by Fuji Xerox Co., Ltd."

A test of outputting a halftone image with an image density of 20% on 200,000 sheets of A4 paper is carried out by using the evaluation apparatus (a test of outputting on 100,000 sheets in an environment of 28° C. and 85% RH and then outputting on 100,000 sheets in an environment of 10° C. and 15% RH). Then, visual observation is made of the presence of white spots in the image output on the 100,000th sheet in an environment of 10° C. and 15% RH (that is, the image output on the 200,000th sheet in total), and evaluation is made based on the following criteria.

A: No white spots

B: Slight white spots

C: White spots within an acceptable range

D: Unacceptable white spots (Actual-apparatus Evaluation B2 (Density Unevenness))

The conductive roller of each of the examples is mounted as a second transfer roller on an evaluation apparatus "DocuPrint CP400d: manufactured by Fuji Xerox Co., Ltd.).

After storage for 12 hours in an environment of 35° C. and 85% RH, a halftone image with an image density of 30% is output on 10 sheets of A4 paper by using the evaluation apparatus. Then, visual observation is made of the presence of density unevenness due to transfer failure in the images output on the 1st to 10th sheets, and evaluation is made based on the following criteria.

A: No density unevenness

B: Slight density unevenness

C: Density unevenness within an acceptable range

D: Unacceptable density unevenness (Evaluation of Storage Property of Conductive Roller)

The conductive roller is allowed to stand and stored for 1 month in an environment of 45° C. and 95% RH in a state in which the conductive elastic layer is in contact with the intermediate transfer belt. The conductive roller after storage is mounted as a second transfer roller on an evaluation apparatus "DocuPrint CP400d: manufactured by Fuji Xerox Co., Ltd".

A halftone image with an image density of 30% is output on 10 sheets of A4 paper by using the evaluation apparatus in an environment of 22° C. and 55% RH. The presence of stripe image defects is visually observed for in images on the 1st to 10th sheets and evaluated based on the following criteria.

A: No stripes are observed.

B: Slight stipes are visually observed.

C: Stripes are observed within an acceptable range.

D: Unacceptable stripes are observed.

(Evaluation of Paper Transportability)

The conductive roller of each of the examples is mounted as a second transfer roller on an evaluation apparatus "DocuPrint CP400d: manufactured by Fuji Xerox Co., Ltd."

A test of outputting a halftone image with an image density of 30% on 200,000 sheets of A4 paper is carried out by using the evaluation apparatus (a test of outputting on 100,000 sheets in an environment of 28° C. and 85% RH and the outputting on 100,000 sheets in an environment of 10° C. and 15% RH). Then, when the 100,000th sheet is output in an environment of 10° C. and 15% RH, paper transportability is evaluated by the speed of paper passing through the transfer roller. In addition, evaluation is made based on the following criteria.

A: Paper transport with no problem (without a decrease in transport speed of paper)

B: Slight decrease in transport speed of paper without problem

C: Decrease in transport speed of paper within an acceptable range

D: Unacceptable decrease in transport speed of paper

TABLE 5

| | | | Example 101 | Example 102 | Example 103 | Example 104 | Example 105 | Example 106 | Example 107 |
|---|---|---|---|---|---|---|---|---|---|
| Elastic layer | Washing time | Minutes | 40 | 20 | 60 | 100 | 10 | 10 | 20 |
| | Amount of chlorine ions | μg/g | 20 | 40 | 10 | 1 | 60 | 60 | 40 |
| | Type of anti-aging agent | | Nocrac 300 bisphenol-based | Nocrac 300 bisphenol-based | Nocrac 300 bisphenol-based | Nocrac 300 bisphenol-based | Nocrac 300 bisphenol-based | Nocrac 300 bisphenol-based | Nocrac 300 bisphenol-based |
| | Molecular weight of anti-aging agent | | 358.55 | 358.55 | 358.55 | 358.55 | 358.55 | 358.55 | 358.55 |
| | Amount of anti-aging agent added | Parts by mass | 3 | 3 | 3 | 3 | 0.3 | 1 | 5 |
| | Rz of inner peripheral surface | μm | 10.0 | 10.0 | 10.0 | 10.0 | 10.0 | 10.0 | 10.0 |
| | Environmental dependence | logΩcm | 1.73 | 1.67 | 1.80 | 1.94 | 1.63 | 1.63 | 1.67 |
| | Adhesion | N·m | 100 | 100 | 100 | 100 | 100 | 100 | 100 |
| Change in resistance of conductive roller | Initial | logΩ | 7.3 | 7.3 | 7.3 | 7.4 | 7.3 | 7.3 | 7.3 |
| | Over-time | logΩ | 7.7 | 7.6 | 7.4 | 7.5 | 8 | 7.8 | 7.6 |
| | Difference between initial and over-time values | logΩ | 0.4 | 0.3 | 0.1 | 0.1 | 0.7 | 0.5 | 0.3 |
| Evaluation | Actual-apparats evaluation B1 (white spot) | | A | A | A | A | C | B | A |
| | Actual-apparatus evaluation B2 (density unevenness) | | A | A | A | C | A | A | A |
| | Storage property of conductive roller | | A | A | A | A | A | A | A |
| | Paper transportability | | B | B | B | B | B | B | B |

TABLE 6

| | | | Example 108 | Example 109 | Example 110 | Example 111 | Example 112 | Example 113 | Example 114 |
|---|---|---|---|---|---|---|---|---|---|
| Elastic layer | Washing time | Minutes | 40 | 40 | 40 | 40 | 3 | 10 | 80 |
| | Amount of chlorine ions | μg/g | 20 | 20 | 20 | 20 | 80 | 60 | 5 |
| | Type of anti-aging agent | | Nocrac 300 bisphenol-based | Nocrac 300 bisphenol-based | Nocrac 200 monophenol-based | Nocrac DAH polyphenol-based | Nocrac 300 bisphenol-based | Nocrac 300 bisphenol-based | Nocrac 300 bisphenol-based |
| | Molecular weight of anti-aging agent | | 358.55 | 358.55 | 220.36 | 250.38 | 358.55 | 358.55 | 358.55 |
| | Amount of anti-aging agent added | Parts by mass | 8 | 10 | 8 | 5 | 1 | 3 | 3 |
| | Rz of inner peripheral surface | μm | 10.0 | 10.0 | 10.0 | 10.0 | 10.0 | 10.0 | 10.0 |
| | Environmental dependence | logΩcm | 1.73 | 1.73 | 1.73 | 1.73 | 1.61 | 1.63 | 1.87 |
| | Adhesion | N·m | 100 | 100 | 100 | 100 | 100 | 100 | 100 |
| Change in resistance of conductive roller | Initial | logΩ | 7.4 | 7.4 | 7.3 | 7.3 | 7.3 | 7.3 | 7.4 |
| | Over-time | logΩ | 7.5 | 7.5 | 7.8 | 7.8 | 7.9 | 7.8 | 7.6 |
| | Difference between initial and over-time values | logΩ | 0.1 | 0.1 | 0.5 | 0.5 | 0.6 | 0.5 | 0.2 |
| Evaluation | Actual-apparats evaluation B1 (white spot) | | A | A | B | B | C | B | A |
| | Actual-apparatus evaluation B2 (density unevenness) | | A | A | A | A | A | A | B |
| | Storage property of conductive roller | | B | C | C | B | A | A | A |
| | Paper transportability | | B | B | B | B | B | B | B |

TABLE 7

| | | | Example 115 | Example 116 | Example 117 | Example 118 | Example 119 |
|---|---|---|---|---|---|---|---|
| Elastic layer | Washing time | Minutes | 10 | 20 | 10 | 10 | 10 |
| | Amount of chlorine ions | μg/g | 60 | 40 | 60 | 60 | 60 |

TABLE 7-continued

|  |  |  | Example 115 | Example 116 | Example 117 | Example 118 | Example 119 |
|---|---|---|---|---|---|---|---|
|  | Type of anti-aging agent |  | Nocrac 300 bisphenol-based | Nocrac 300 bisphenol-based | Nocrac PA amine-based | Nocrac CD amine-based | Nocrac MBZ imidazole-based |
|  | Molecular weight of anti-aging agent |  | 358.55 | 358.55 | 219.28 | 405.57 | 397.88 |
|  | Amount of anti-aging agent added | Parts by mass | 0.1 | 13 | 10 | 10 | 10 |
|  | Rz of inner peripheral surface | μm | 10.0 | 10.0 | 10.0 | 10.0 | 10.0 |
|  | Environmental dependence | logΩcm | 1.63 | 1.67 | 1.63 | 1.63 | 1.63 |
|  | Adhesion | N · m | 100 | 100 | 100 | 100 | 100 |
| Change in resistance of conductive roller | Initial | logΩ | 7.3 | 7.4 | 7.4 | 7.4 | 7.4 |
|  | Over-time | logΩ | 8.1 | 7.7 | 7.9 | 7.9 | 7.9 |
|  | Difference between initial and over-time values | logΩ | 0.8 | 0.3 | 0.5 | 0.5 | 0.5 |
| Evaluation | Actual-apparats evaluation B1 (white spot) |  | C | A | C | C | C |
|  | Actual-apparatus evaluation B2 (density unevenness) |  | A | A | A | A | A |
|  | Storage property of conductive roller |  | A | D | D | D | D |
|  | Paper transportability |  | B | B | B | B | B |

TABLE 8

|  |  |  | Comparative Example 101 | Comparative Example 102 | Comparative Example 103 | Comparative Example 104 | Comparative Example 105 | Comparative Example 106 | Reference Example 101 |
|---|---|---|---|---|---|---|---|---|---|
| Elastic layer | Washing time | Minutes | No | 10 | No | 120 | No | No | No |
|  | Amount of chlorine ions | μg/g | 100 | 60 | 100 | Undetectable | 100 | 100 | 100 |
|  | Type of anti-aging agent |  | Nocrac 300 bisphenol-based | No | No | Nocrac 300 bisphenol-based | No | No | No |
|  | Molecular weight of anti-aging agent |  | 358.55 | — | — | 358.55 | — | — | — |
|  | Amount of anti-aging agent added | Parts by mass | 0.3 | — | — | 3 | — | — | — |
|  | Rz of inner peripheral surface | μm | 10.0 | 10.0 | 10.0 | 10.0 | 28 | 7.0 | 10.0 |
|  | Environmental dependence | logΩcm | 1.60 | 1.63 | 1.60 | 2.00 | 1.60 | 1.60 | 0.20 |
|  | Adhesion | N · m | 100 | 100 | 100 | 100 | 20 | 120 | 100 |
| Change in resistance of conductive roller | Initial | logΩ | 7.3 | 7.3 | 7.2 | 7.4 | 7.2 | 7.2 | 7.3 |
|  | Over-time | logΩ | 8.2 | 8.3 | 8.5 | 7.5 | 8.5 | 8.7 | 7.3 |
|  | Difference between initial and over-time values | logΩ | 0.9 | 1 | 1.3 | 0.1 | 1.3 | 1.5 | 0 |
| Evaluation | Actual-apparats evaluation B1 (white spot) |  | D | D | D | A | D | D | A |
|  | Actual-apparatus evaluation B2 (density unevenness) |  | A | A | A | D | A | A | A |
|  | Storage property of conductive roller |  | A | A | A | A | A | A | A |
|  | Paper transportability |  | B | B | B | B | C | B | B |

The above results indicate that when the conductive roller of each of the examples is applied to a transfer roller, the occurrence of white spots and the occurrence of density unevenness due to transfer failure are suppressed and good storage property is exhibited as compared with the conductive rollers of the comparative examples. It is also found that paper transportability is exhibited.

That is, the conductive rollers of the examples are also useful as a transfer roller.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A conductive member comprising:
   a conductive substrate; and
   a conductive elastic layer disposed on the conductive substrate and exhibiting ionic conduction, wherein the conductive elastic layer contains an elastic material, which contains epichlorohydrin rubber, and an anti-aging agent, and an amount of free chlorine ions in the conductive elastic layer is not less than 5 µg/g and not more than 80 µg/g.

2. The conductive member according to claim 1, wherein the anti-aging agent is a phenol-based anti-aging agent.

3. The conductive member according to claim 1, wherein the amount of free chlorine ions is not less than 5 µg/g and not more than 60 µg/g.

4. The conductive member according to claim 1, wherein the amount of free chlorine ions is not less than 10 µg/g and not more than 40 µg/g.

5. The conductive member according to claim 1, wherein a content of the epichlorohydrin rubber is not less than 10 parts by mass and not more than 100 parts by mass relative to 100 parts by mass of the elastic material.

6. The conductive member according to claim 1, wherein a content of the epichlorohydrin rubber is not less than 50 parts by mass and not more than 100 parts by mass relative to 100 parts by mass of the elastic material.

7. A charging device comprising the conductive member according to claim 1 as a charging member that charges a body to be charged.

8. A process cartridge detachably provided on an image forming apparatus, the process cartridge comprising the charging device according to claim 7.

9. An image forming apparatus comprising:
an image holding member;
the charging device according to claim 7, that charges the surface of the image holding member;
an electrostatic latent image forming device that forms an electrostatic latent image on the charged surface of the image holding member;
a developing device that develops, with a developer containing a toner, the electrostatic latent image formed on the surface of the image holding member to form a toner image; and
a transfer device that transfers the toner image to the surface of a recording medium.

10. A transfer device comprising the conductive member according to claim 1 as a transfer member that transfers a transferred material to a transfer body.

11. A process cartridge detachably provided on an image forming apparatus, the process cartridge comprising the transfer device according to claim 10.

12. An image forming apparatus comprising:
an image holding member;
a charging device that charges the surface of the image holding member;
an electrostatic latent image forming device that forms an electrostatic latent image on the charged surface of the image holding member;
a developing device that develops, with a developer containing a toner, the electrostatic latent image formed on the surface of the image holding member to form a toner image; and
the transfer device according to claim 8, that transfers the toner image to the surface of a recording medium.

13. The conductive member according to claim 1, wherein the epichlorohydrin rubber is a terpolymer rubber.

14. The conductive member according to claim 1, wherein the epichlorohydrin rubber is a epichlorohydrin-ethylene oxide-allyl glycidyl ether copolymer rubber.

15. The conductive member according to claim 1, wherein an amount of the anti-aging agent is not less than 0.3 parts by mass and not more than 10 parts by mass relative to 100 parts by mass of the elastic material.

* * * * *